US008865035B2

(12) United States Patent
Minney et al.

(10) Patent No.: US 8,865,035 B2
(45) Date of Patent: Oct. 21, 2014

(54) METHOD FOR CONTROLLING RF ENERGY APPLIED TO MOLDS

(71) Applicant: Engineering & Research Associates, Inc., Tucson, AZ (US)

(72) Inventors: Stephen C. Minney, Tucson, AZ (US); Tulsie P. Sumeer, Tucson, AZ (US); Yee Chin Wong, Highland Ranch, CO (US); Joseph G. Augustine, Denver, CO (US)

(73) Assignee: Vante Inc., Tucson, AZ (US)

( * ) Notice: Subject to any disclaimer, the term of this patent is extended or adjusted under 35 U.S.C. 154(b) by 0 days.

(21) Appl. No.: 13/771,589

(22) Filed: Feb. 20, 2013

(65) Prior Publication Data

US 2013/0206317 A1    Aug. 15, 2013

Related U.S. Application Data

(62) Division of application No. 12/702,180, filed on Feb. 8, 2010, now Pat. No. 8,469,688.

(60) Provisional application No. 61/148,861, filed on Jan. 30, 2009.

(51) Int. Cl.
| | |
|---|---|
| *B29C 33/06* | (2006.01) |
| *B29L 23/00* | (2006.01) |
| *B29C 65/32* | (2006.01) |
| *B29C 33/12* | (2006.01) |

(52) U.S. Cl.
CPC ............ *B29C 33/06* (2013.01); *B29L 2023/00* (2013.01); *B29C 65/32* (2013.01); *B29C 33/12* (2013.01)
USPC ......................... 264/40.1; 264/328.8; 700/201

(58) Field of Classification Search
USPC ................................ 264/40.1, 328.8; 700/201
See application file for complete search history.

(56) References Cited

U.S. PATENT DOCUMENTS

| | | | |
|---|---|---|---|
| 2,647,983 | A | 8/1953 | Boyd |
| 4,013,860 | A | 3/1977 | Hosterman et al. |
| 4,186,292 | A | 1/1980 | Acker |
| 4,390,832 | A | 6/1983 | Taylor |
| 4,490,598 | A | 12/1984 | Minney et al. |
| 4,491,711 | A | 1/1985 | Acker |
| 4,496,819 | A | 1/1985 | Acker et al. |
| 4,529,859 | A | 7/1985 | Minney et al. |
| 4,661,300 | A | 4/1987 | Daugherty |
| 4,739,759 | A | 4/1988 | Rexroth et al. |
| 4,914,267 | A | 4/1990 | Derbyshire |
| 5,088,911 | A | 2/1992 | Kumazaki |
| 5,160,396 | A | 11/1992 | Jensen et al. |
| 5,256,845 | A | 10/1993 | Schippers |

(Continued)

*Primary Examiner* — Yogendra Gupta
*Assistant Examiner* — Kimberly A Stewart
(74) *Attorney, Agent, or Firm* — The von Hellens Law Firm, Ltd.

(57) ABSTRACT

Each platform mounted mold assembly for plastic tubing includes a circuit board containing parameters defining elements of the forming, molding, tipping or welding operation to be undertaken on the tubing. A control unit includes an RF generator for providing the RF energy to effect the forming, molding, tipping or welding process, a source of air under pressure to operate the mechanical elements attendant each mold assembly, various sensors and a multiplex unit. In operation, the control unit serially addresses each of the mold assemblies, senses the parameters attendant the mold and applies the appropriate power level of RF energy for a specific duration and temperature while activating the mechanical aspects of the mold assembly. The mold assemblies may be serially activated through a multiplex unit or in a particular sequence that may be operator controlled.

14 Claims, 9 Drawing Sheets

(56) References Cited

U.S. PATENT DOCUMENTS

| | | |
|---|---|---|
| 5,349,166 A | 9/1994 | Taylor |
| 5,360,330 A | 11/1994 | Jensen et al. |
| 5,697,925 A | 12/1997 | Taylor |
| 6,113,592 A | 9/2000 | Taylor |
| 6,145,022 A | 11/2000 | Takizawa et al. |
| 6,784,407 B2 | 8/2004 | Wright et al. |
| 7,438,548 B2 | 10/2008 | Augustine et al. |
| 2006/0082009 A1 | 4/2006 | Quail et al. |
| 2007/0256791 A1 | 11/2007 | Augustine et al. |
| 2011/0192527 A1 | 8/2011 | Minney et al. |

METHOD FOR CONTROLLING RF ENERGY APPLIED TO MOLDS

CROSS REFERENCE TO RELATED APPLICATIONS

The present application is a divisional of an application entitled "RF Generator with Multiplexed Programmed Molds", filed Feb. 8, 2010 and assigned Ser. No. 12/702,180, which is related to and claims priority to a provisional application entitled "RF GENERATOR WITH MULTIPLE MOLDS", Ser. No. 61/148,861, filed Jan. 30, 2009, which applications are assigned to the present assignee.

BACKGROUND OF THE INVENTION

1. Field of the Invention

The present invention relates to forming, molding, tipping and welding plastic tubing and, more particularly, to molds having data incorporated in a circuit for controlling the operation of an RF generator to heat, form, mold, tip and weld the tubing within the mold and including a multiplexing capability for interconnecting a plurality of such molds with a single RF generator and controller or computer.

2. Description of Related Prior Art

Molds forming, molding, tipping and welding plastic tubing are connected to a source for producing an electrical signal to heat the mold and thereby cause the forming, molding, tipping or welding of plastic material, such as tubing. Heating of the mold may be by resistance heating or inductive heating as the most common forms. In the latter case, radio frequency (RF) energy is employed and an RF generator is electrically connected to the mold to provide the requisite energy source. For different molds or molds having differing capabilities and functions, the electrical signal applied must be tailored or otherwise adapted within the RF generator to ensure proper and successful forming, molding, tipping and/or welding of the tubing. This procedure has the possibility of inadvertently resulting in operator error. That is, an operator may inadvertently enter incorrect parameters into the control circuit for the RF generator. As a result, the forming, welding, tipping or welding of the plastic tubing will not occur as intended. Sometimes, presumably identical molds are in fact not identical due to manufacturing errors or operator fault. In either case, the parameters preset in the RF generator will not produce the desired function on the plastic tubing.

Presently, each mold requires its own RF generator which results in various less than preferred situations. The use of a single mold with a single RF generator requires an operator between each operation to load the mold with the plastic tubing and after the operation to unload the tubing from the mold. Where a rapid throughput is required or strongly preferred, the time involved for such loading and unloading between each operation has a negative impact on the throughput. The use of a single RF generator to energize a single mold requires significant capital expense when a plurality of molds are required by production criteria. That is, the costs of the mold and the RF generator are significant and result in a significant cost per operation of forming, molding, tipping and/or welding the tubing.

In summary, the current practice is to manually enter the settings into a control module, such as a computer, at the time of installation of the tooling/mold or enter settings in advance and select the appropriate settings at the time of use. In most controlled manufacturing plants, different individuals originate and validate the proper settings for a given operation on a mold than the personnel who use the mold routinely in production. The correct use requires production personnel to duplicate the setting procedure. This takes time and is a potential source of error. Accordingly, a method that would save time and ensure accuracy of the settings is sought.

SUMMARY OF THE INVENTION

The present invention includes a single RF generator for generating RF energy to heat a mold and form, mold, tip and/or weld plastic tubing disposed in the mold in a mold assembly. Each mold assembly includes a circuit board electrically connected to the RF generator and/or a controller therefor for providing control signals to the RF generator to produce actuating signals for the mold commensurate with the parameters of the mold. No operator input is required. To enhance the efficiency of use of the RF generator, a multiplexing circuit may be incorporated to serially or in a specified order energize each of the molds pursuant to the parameters of each mold as reflected in its control signals.

An electrically shielded module containing an electronic assembly with a semiconductor memory device and a semiconductor identification device is part of the mold assembly. Signals to and from the module or circuit board are routed through conductors along with the temperature sensing and heating power conductors through interconnections between the mold assembly and the supporting electromechanical platform. From the platform, the signals are conducted to the RF generator/computer. With appropriate software/programming, the computer is enabled to automatically load the settings from the memory and use them to control the heating, cooling, motion and other functions. These settings may have been previously determined to be correct by appropriate individuals and loaded into the memory. Thereafter, the routine use of the mold by production personnel is facilitated by not having to re-enter the settings and the control/accuracy is assured. In locations where many different products are made, the savings in time and reduction in bad product due to incorrect equipment settings may be substantial. Quality system requirements at manufacturing facilities involving documentation and controls may be improved by better control of the settings for the apparatus. If the computer is additionally programmed to output or log data for each use, the identification and settings will provide further benefits. When the mold assembly with memory and I.D. apparatus are used with a plurality of platforms simultaneously connected to one RF generator that is suitably equipped with switching means, such as a multiplexer, and software, the computer can automatically load the settings from each mold and then execute the control sequence for each molding operation with the corresponding settings as each platform/mold is used. Multiple parts with different settings may than be made with one RF generator/computer with one or more operators, resulting in decreased costs and improved process control. If suitably programmed and equipped with data output (logging) devices, the I.D. (or other reference stored in the memory of each mold assembly) may be entered into the record output by the RF generator/computer, with each molding operation's information interleaved with the other molds' records.

It is therefore a primary object of the present invention to provide a mold assembly having unique parameters of operation translated into control signals for an RF generator to actuate the operation of the mold assembly in conformance with such control signals.

Another object of the present invention is to provide a multiplexing capability for a single RF generator to serially actuate each of a plurality of mold assemblies.

Still another object of the present invention is to provide the capability for interconnecting a plurality of different mold assemblies with a single RF generator and control the operation of each mold assembly in conformance with control signals produced by each mold assembly.

Yet another object of the present invention is to provide a multiplexing capability for interconnecting and energizing each of a plurality of mold assemblies with a single RF generator.

A further object of the present invention is to provide a mold assembly having a circuit board for providing control signals to a connected RF generator for controlling the actuating signal from the RF generator to the mold assembly.

A still further object of the present invention is to provide apparatus for eliminating the requirement for an operator to enter control signals into an RF generator to provide the requisite electrical energy to a mold assembly.

A yet further object of the present invention is to provide a method for having a mold assembly, energized by an RF generator, control the signals generated by the RF generator for energizing the mold assembly.

These and other objects of the present invention will become apparent to those skilled in the art and the description thereof proceeds.

BRIEF DESCRIPTION OF THE DRAWINGS

The present invention will be described with greater specificity and clarity with reference to the following drawing, in which.

DESCRIPTION OF THE PREFERRED EMBODIMENT

The purposes and functions of the present invention are directed to two primary features. First, a multiplexer is incorporated to reduce the overall system cost by sharing expensive components between numerous less expensive elements. Previously, every mold assembly supporting platform, which is a relatively low-cost component, had to be joined to a dedicated RF generator, a high-cost component. To increase functionality and reduce overall costs of the equipment, the present invention allows leveraging the high-cost component, the RF generator, with multiple mold assembly supporting platforms. A multiplexer is used to provide this function whereby each of the mold assembly supporting platforms has access to the shared component, the RF generator. The use of a multiplexer provides serial access between each mold assembly supporting platform and the RF generator in the nature of time sharing.

A second feature of the present invention relates to the input to a computer controlled RF generator of the parameters of a particular platform mounted mold assembly to obtain the requisite forming, molding, tipping or welding of the plastic material, which may be plastic tubing, to be acted upon. Presently, such parameters are manually entered into a computer controlling operation of the RF generator. While this procedure is adequate, operator errors may occur through incorrect settings. Furthermore, as each mold may have different parameters as a function of the forming, molding, tipping or welding to be accomplished, the settings for a previously used mold assembly may be inadvertently not changed. Additionally, as throughput is always an important function in any manufacturing process, significant delays may result from the requirement of operator input of settings for each mold assembly. By incorporating a control circuit, such as a PC board or memory chip, in each mold assembly, it can be programmed to contain the parameters of the mold. Upon interrogation of the control circuit by a computer, the required settings for the RF generator will be automatically established. This avoids potential operator error, reduces setup time and facilitates changing of mold assemblies and attendant automatic resetting of the RF generator to provide the requisite RF generator operation.

Figure 1A:
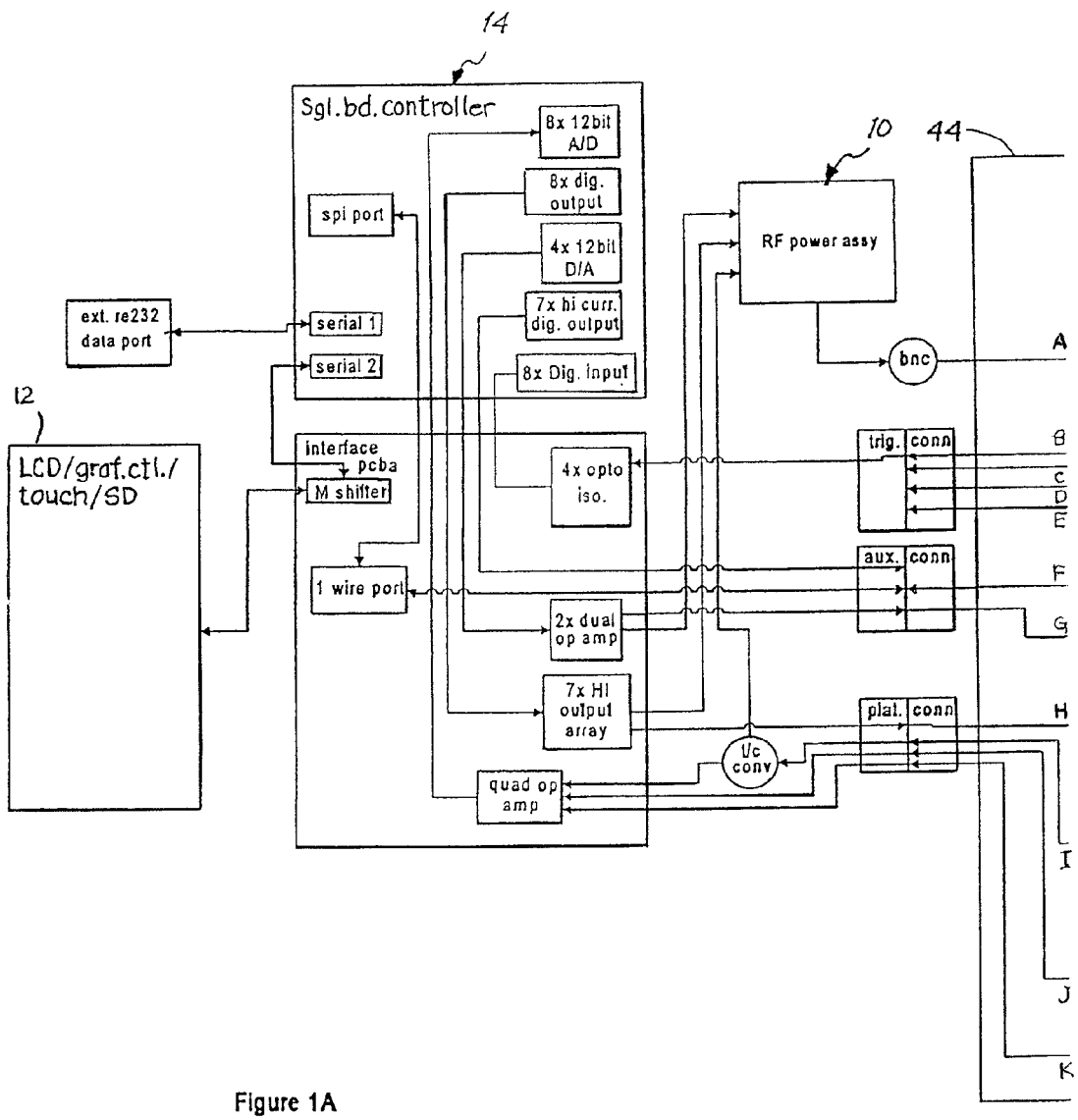
FIGS. 1A and 1B are a system diagram of the components of the present invention and the interconnections therebetween.
Figure 1B:
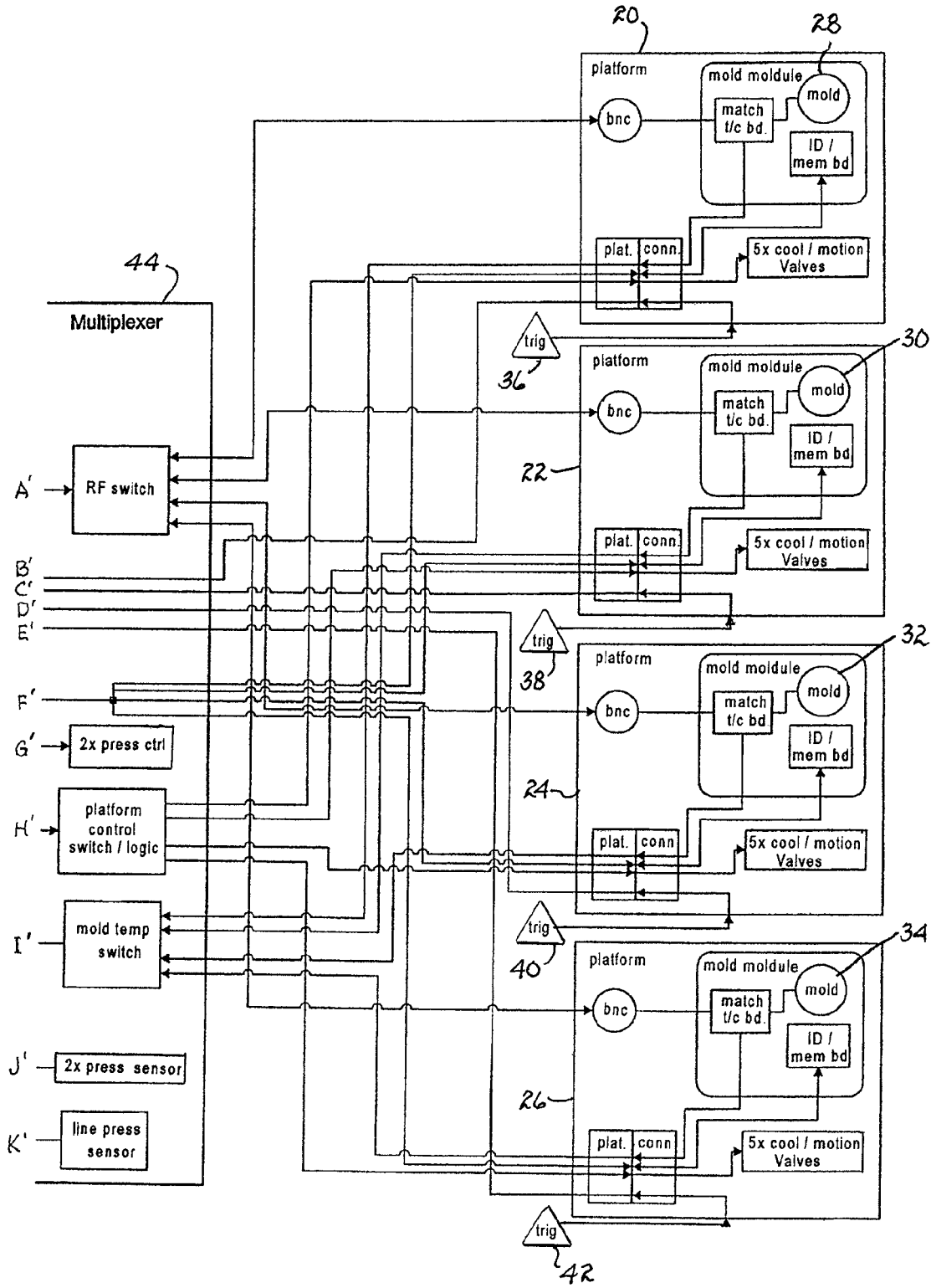

Referring to FIGS. 1A and 1B, a detailed system diagram illustrates the preferred embodiment of the present invention. It includes RF generator 10, temperature and motion control circuitry attendant each mold and mold platform, an HMI touch screen 12 and a computer 14. Each platform 20, 22, 24 and 26 supports a mold assembly including a mold 28, 30, 32 and 34 and a trigger or switch 36, 38, 40 and 42, respectively. A multiplexer 44 serially interconnects the mold assemblies and molds 28, 30, 32 and 34 with the RF generator, as well as various other functions to be performed.

Figures 2, 3:
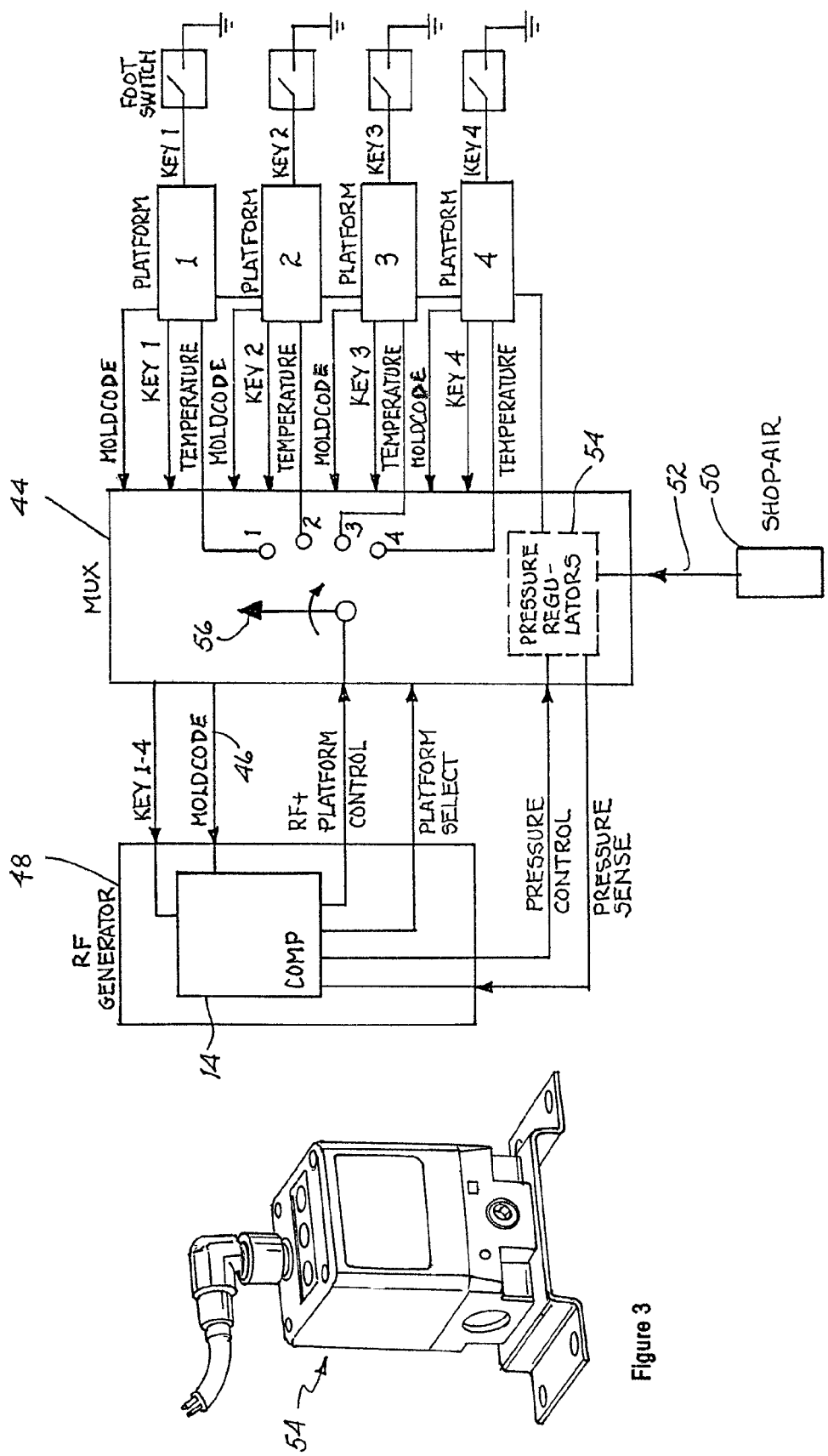
FIG. 2 illustrates the function and operation of a multiplexing unit interconnecting an RF generator and associated computer/controller with each of a plurality of mold platforms.
FIG. 3 is a representative view of a commercial pressure regulator for controlling the air pressure applied to each respective mold platform.

FIG. 2 is a simplified block diagram of the system shown in FIGS. 1A and 1B. Each mold assembly is mounted on one of platforms 1, 2, 3 or 4. Each mold assembly includes a control circuit to provide electrical signals corresponding with the unique parameters of the mold. These signals are transmitted to multiplexer 44 via the electrical conductors identified as mold code. The mold code is transmitted via electrical conductor 46 to computer 14. The computer controls operation of the RF circuit represented by RF generator 48. A source 50 of air under pressure, identified as "shop-air", conveys through tubing 52 air under pressure to pressure regulators 54. The pressure regulators, under control of the computer through a conductor identified as pressure control in response to a signal conveyed to the computer through a conductor identified as pressure sense causes an outflow of air under pressure from the pressure regulators is interconnected by one manifold with the molds and fixtures on each of platforms 1, 2, 3 and 4. As illustrated, a foot switch may be associated with each of the platforms and operation of the respective foot switch is conveyed through the multiplexer to computer 14 by the conduits identified as key 1, key 2, key 3 and key 4. Additionally, temperature sensing and control attendant each of the molds is conveyed through conductors identified by the term temperature and corresponding with each respective mold. When a foot switch attendant one of the platforms is closed, a signal is sent to the computer. Once the computer receives the signal it then sends a specific platform select signal and a pressure control signal to the multiplexer. The multiplexer then connects the RF generator, pneumatic valves and temperature sensing signals for use in temperature and motion control to the triggered platform and disconnects the signals from the other platforms. For example, if the switch located on platform 1 is closed, the computer senses that platform 1 has been activated. The computer then signals the multiplexer to connect a thermocouple, RF conductor and motion control lines to platform 1 to the RF generator. The computer then signals the pressure control modules, which may be located in the multiplexer, to change to the appropriate pressure for platform 1. All of the platforms share a common pressure source.

Referring to FIG. 3, there is shown an off-the-shelf digital pressure regulator 54 manufactured by SMC. Two of these regulators may be present in the multiplexer. They receive different signals from the RF generator depending on the setting for the particular platform to be activated. They adjust to pressure proportionately to the signal they receive (0-5 v). The resulting pressure is relative to the platforms and may be continually shared.

Figure 4:
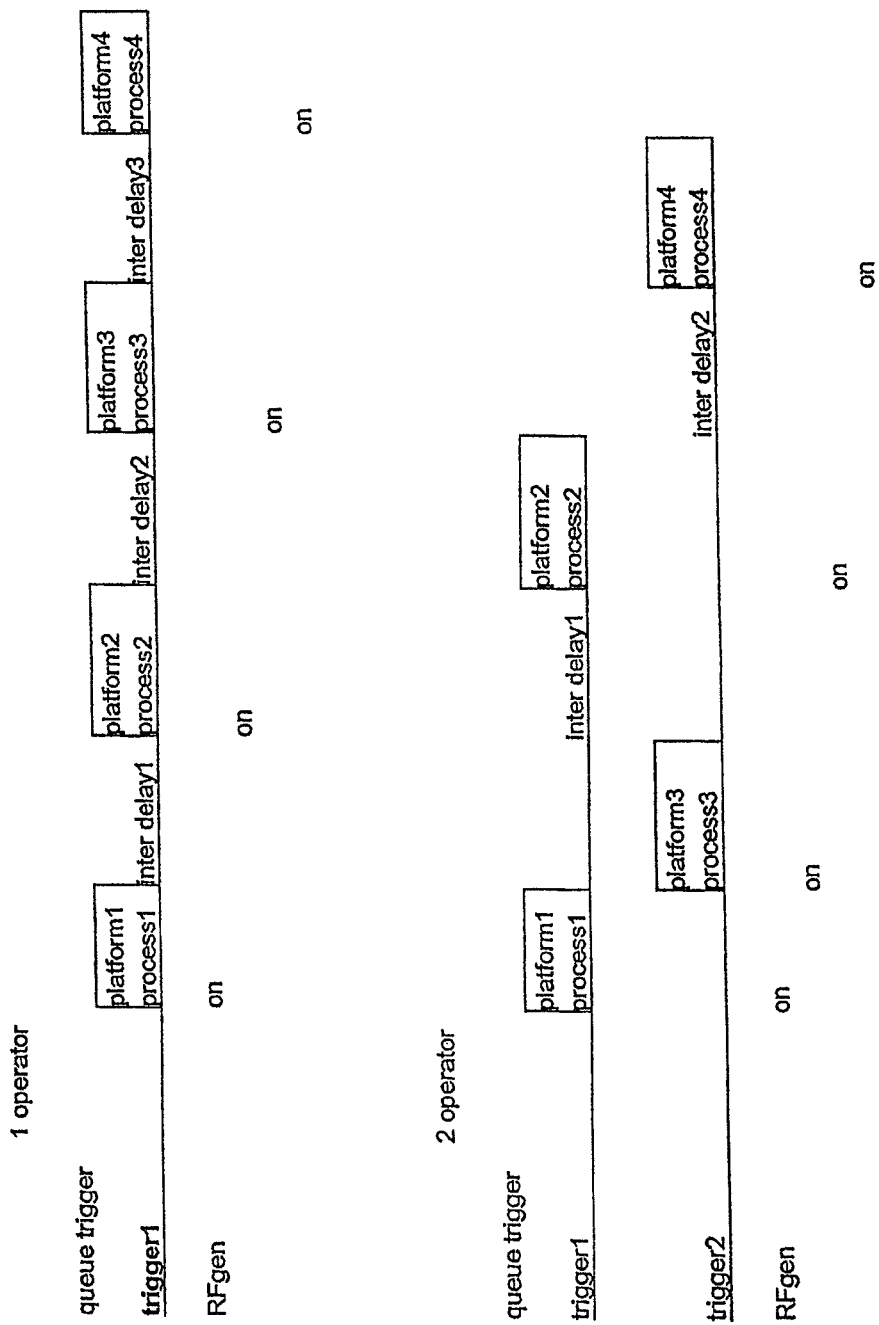
FIG. 4 is a representative drawing illustrating optional sequencing for energizing some or all of the mold platforms.

FIG. 4 illustrates the sequential nature of multiplexing that may be entertained in the present invention. Presently, the apparatus has two constraints unique to the apparatus:
1. The RF generator has a duty cycle constraint of approximately 50% to maintain a relatively small size cabinet and acceptable weight without further heat sink devices, fans, etc.;
2. The number of input/output lines available and the simultaneous processing tasks/times that can be handled by the controller are initially set by a known multiplexing apparatus. To maintain the enclosure size, power supply limits, heat generation, etc. the controller input/output lines are switched in the multiplexer and the process logic for the individual molds/platforms is run sequentially.

Presently there are three types of queuing modes:
1. Mode 1 configures a system for a "next up" scenario. In an environment where each platform has an operator, the RF generator will only recognize triggers when it is in an idle state (not providing signals to the platform). Whichever platform is triggered will then immediately begin to operate. For example, if the cycle for platform number 2 has just ended, and if someone now triggers platform number 3 it will begin to operate.
2. Mode 2 configures the system for a "first come, first served" or "take a number" operation. In an environment where each platform may have an operator, the RF generator will monitor triggers (foot switches illustrated in FIG. 2) even when it is not in an idle state. For example, if platform number 2 is running and platform number 3 is triggered before the cycle finishes, the RF generator will operate platform number 3 as soon as operation on platform number 2 has terminated.
3. Mode 3 allows the operator to set up a predefined order in which the platforms will be operated. By triggering (foot switch actuation) any one of the platforms will cause a sequence of operation to begin. For example, if the order of operation of the platforms is intended to be 1, 3, 4 and 2, and platform number 3 is triggered, the RF generator will cause operation of platforms number 1, 3, 4 and 2. This mode is commonly used in an environment where a single operator is operating several platforms.

Most molds used to form, mold, tip or weld plastic material, such as plastic tubing, require a unique set of parameters in order to perform the intended function. The parameters are simply settings used to operate the mold, mold assembly and the platform correctly for a particular application. Though the parameters may be unique for any given mold, the type of information stored remains constant. For example, the parameters include temperature, heat time, cool time and pressure, to name a few. Sometimes changing these in the RF generator (or an associated computer) every time a mold is changed is not only cumbersome but fraught with the possibility of erroneous entries. This is exacerbated by the fact that there may be up to 30 different parameters for each mold and the likelihood of operator mistake is high. One way of overcoming potential operator error is to store the parameters in the RF generator/computer. For a limited number of different molds, this may be practical but when there is a possibility of using 100 or more molds, the information to be stored in the RF generator/computer is far too vast. In addition, any repair work on the RF generator/computer creates a risk of changes to the stored parameters or even loss of some or all of the parameters. To prevent such potentially disastrous result, all of the parameters would have to be recorded and possibly reentered on completion of the repairs. Such work would necessarily delay return to service of the equipment and give rise to the possibility of misentry of some parameters.

By storing the information attendant a mold in the mold assembly itself and having the RF generator/computer interrogate the mold as to its unique parameters, any need for storing the parameters other than in a mold assembly is completely avoided. Moreover, during manufacture of a mold to perform a particular forming, molding, tipping or welding function on plastic material, whether plastic tubing or otherwise, the attendant parameters are determinable and a circuit board, memory chip or other interrogatable data source formed as part of or attached to the mold assembly renders the mold ready for use on receipt by the user. These features are representatively illustrated in FIGS. 5 and 6. FIG. 7 is a representative illustration of a presently available conventional memory integrated circuit 56 that could be programmed to contain the respective parameters. Moreover, the memory integrated circuit can be readily interrogated to provide the parameters attendant operation of the associated mold. A circuit board supporting the requisite information containing components could similarly be associated with or otherwise attached to each mold assembly.

Figure 5:
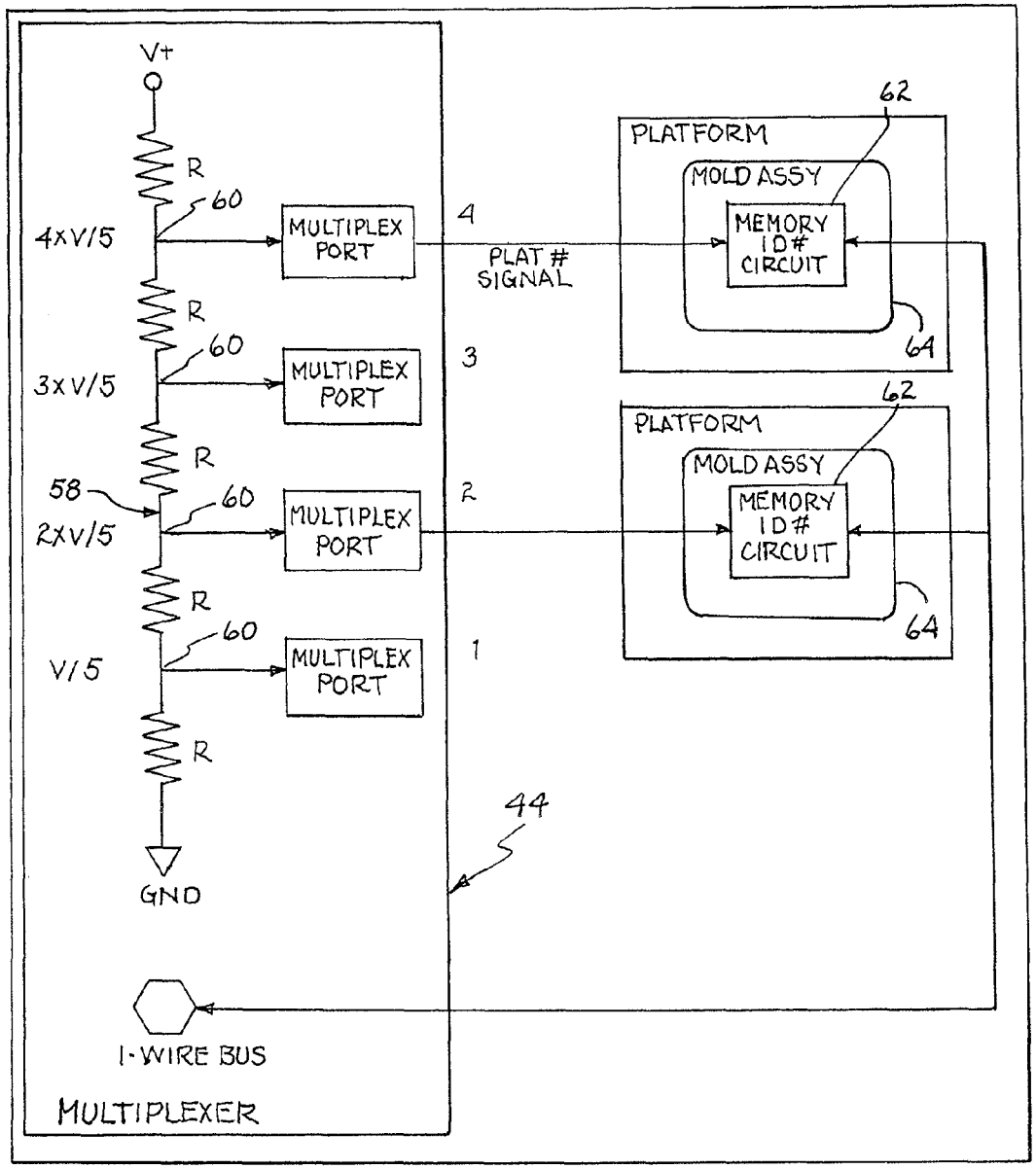
FIG. 5 is a circuit diagram illustrating an interconnection between the multiplexer and the control circuit in each mold platform delivering the parameters of such mold.

In particular, FIG. 5 illustrates a voltage divider 58 located within the multiplexer electronic assembly 44. It is shown with nodes 60 between resistors R that are connected to the connectors (ports) through which control signals are passed to each of the platforms. The connections are such that the applied voltage (which may be +5 vdc) divided by five is connected to a platform number signal pin in the connector to attach platform number 1. The corresponding pin in the second platform's connector (platform number signal) is connected to the next higher divider node; that is, 2×V/5. If V+ is 5 vdc then the platform number signal for platform number 1 is 1 vdc, platform number 2 is 2 vdc, platform number 3 is 3 vdc and platform number 4 is 4 vdc. The right hand side of FIG. 5 illustrates these connections for platforms numbers 2 and 4. It also shows the electrical connections connected to the memory ID symbol number circuit 62 within the mold assembly and memory containing assembly 64. This mold assembly is mechanically attached and electrically connected to a platform. Two such platforms are shown in FIG. 5 along with the mold assemblies connected to ports 2 and 4.

An additional connection is shown to each mold and platform assembly which is in turn connected to the others and then to the multiplexer. This additional connection is the "1-wire bus" signal. The 1-wire network protocol is a serial bus connection. All devices share 1-wire and each device node has a unique network address on that bus. It is necessary for the operation of this apparatus that the mold/memory be associated with the platform within which it is physically located in order to properly apply the control signals to that platform and the associated task.

Figure 6:
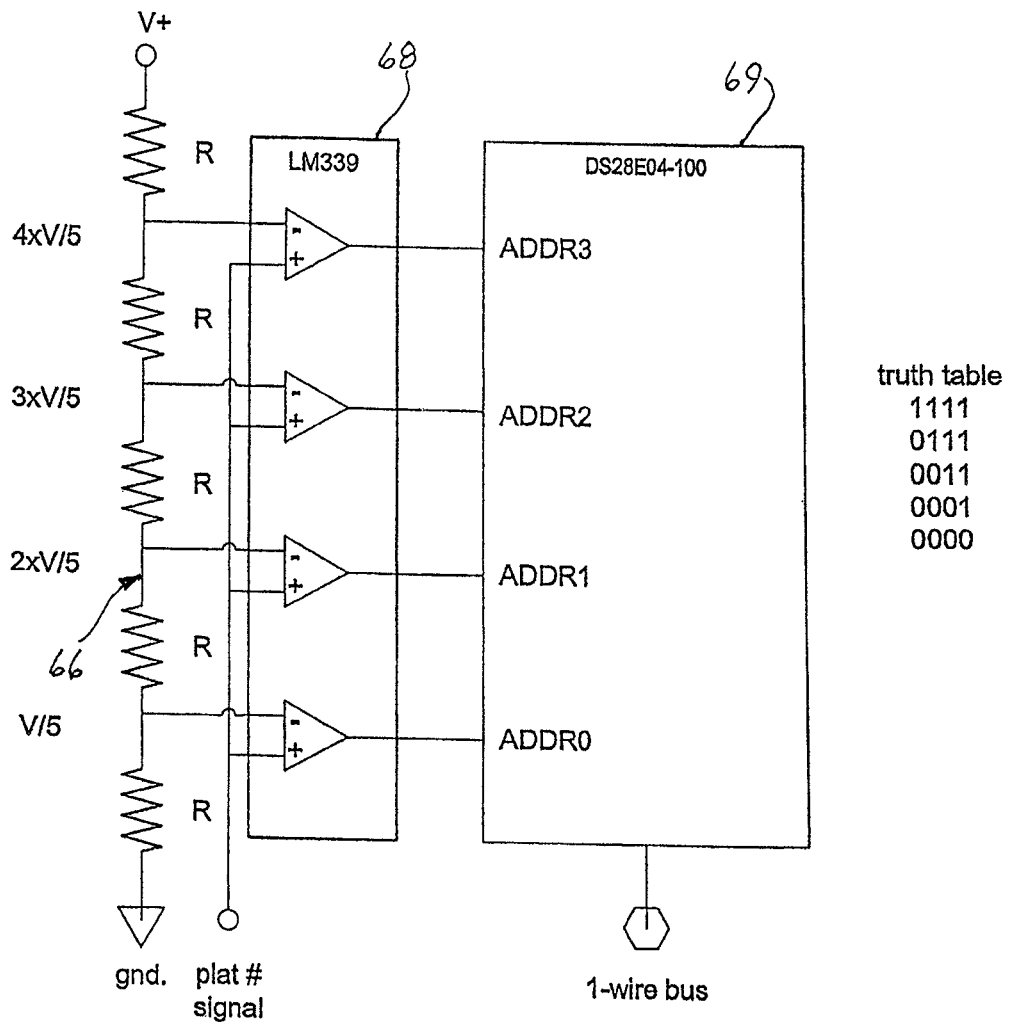
FIG. 6 illustrates a circuit for identifying the molds to be energized.
Figure 7:
FIG. 7 is a representation of a memory integrated circuit.

FIG. 6 details the memory ID number circuit within the mold assembly. A second voltage divider 66 similar to the one shown in FIG. 5 is connected to a "quad comparator" (such as a LM339) device 68 inverting inputs as references for V/5, 2×V/5, etc. and the platform number signal is simultaneously connected to the non-inverting inputs of all comparators. In practice, the resistor values have slightly changed from the multiplex divider (58 FIG. 5) such that the resistor closest to ground in the platform is somewhat smaller than its counterpart to allow a margin for noise. Thus, with 1 vdc coming from the multiplexer platform number 1 connector, the reference at the V/5 comparator would be set to 1-0.2 vdc. The outputs of the four comparators are routed to the least significant four address inputs of the DS28E04-100 memory device 69 (4096 bit 1-wire EEPROM, Dallas Semiconductor). Referring to the truth table, if the platform number signal is less than the voltage required to turn on the first comparator, then all address lines are 0. If the signal is 1 vdc, then the result is a logical 0001. If the voltage is 4 vdc then all four bits are set. These bits are contained in the 64-bit device I.D. that may be read over the 1-wire network. By this means, the 1-wire network device discovery protocol software run in the generator/controller may associate the physical location within each platform for each of the memories found.

A preferred embodiment of mold assembly is illustrated in FIG. 8-13. Certain details of this mold assembly relating to the structure and operation is set forth in U.S. Pat. No. 7,438,548 entitled "APPARATUS FOR RAPIDLY HEATING AND COOLING A CATHETER MOLD", filed Oct. 31, 2006, which is assigned to the present assignee. The substance of the information contained in this patent is incorporated herein by reference.

Figure 8:
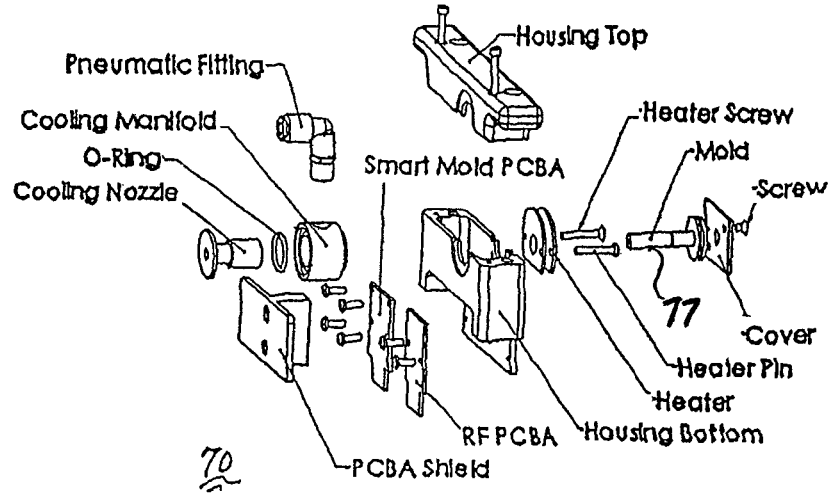
FIG. 8 illustrates an exploded view of the mold and the mold assembly.
Figure 9:
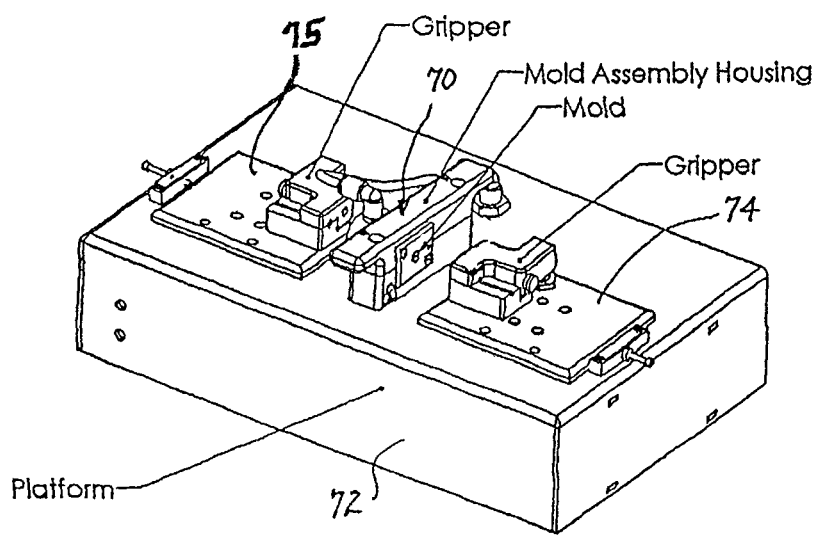
FIG. 9 illustrates the mold assembly mounted on a platform for inserting and withdrawing tubing to be acted upon by the mold and mold assembly.
Figure 10:
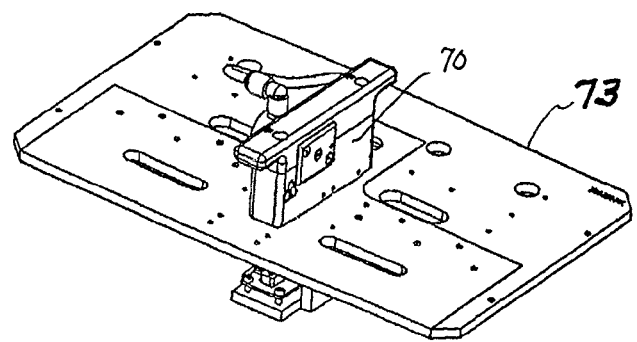
FIG. 10 illustrates the mold housing attached to a substrate within the platform.
Figure 11:
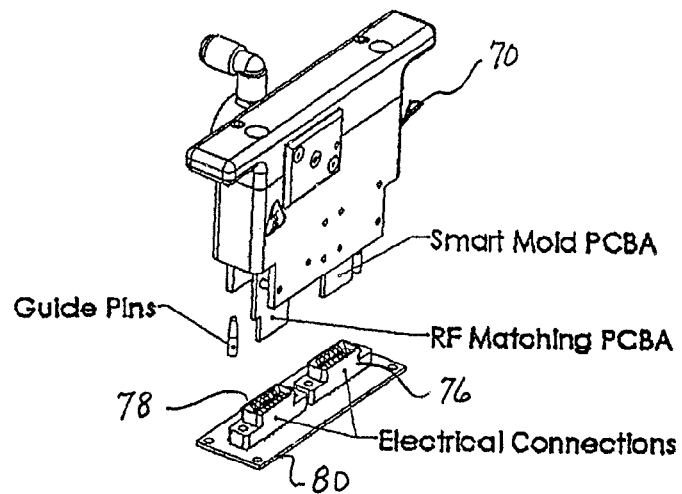
FIG. 11 illustrates the mold assembly and electrical connectors of the platform connectable to PC boards of the mold assembly.
Figure 12:
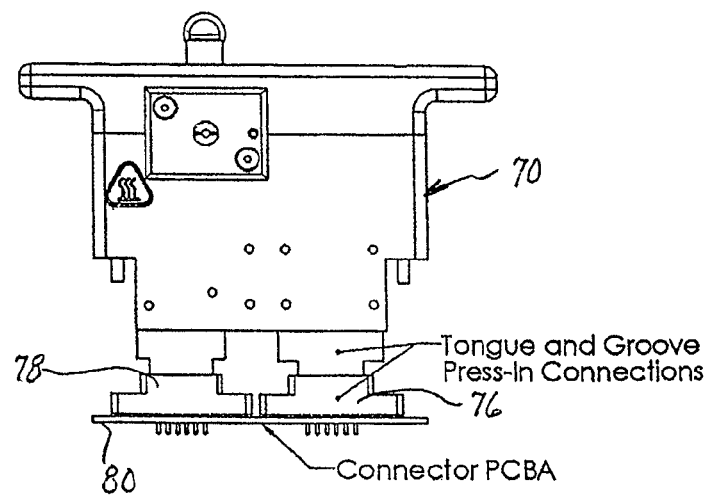
FIG. 12 illustrates the mold assembly attached to press-in connectors.
Figure 13:
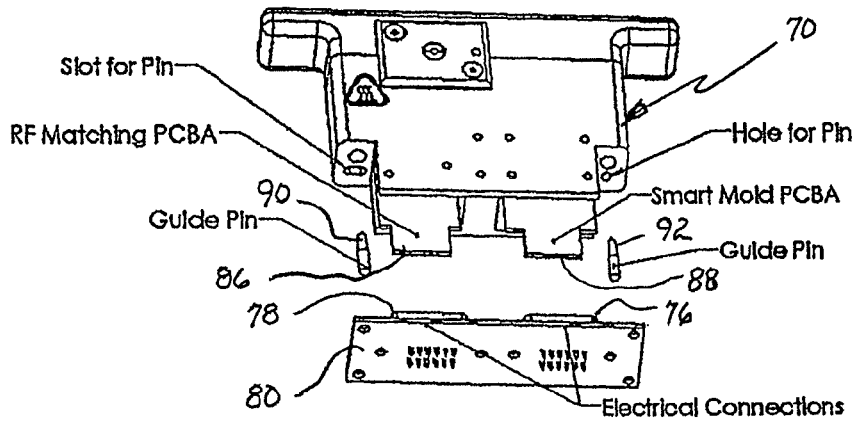
FIG. 13 is a further view illustrating the electrical connectors attachable to the mold assembly.

FIG. 8 is an exploded view of mold assembly 70 and various components are functionally labeled. This particular mold assembly may be used for forming, molding, tipping and/or welding plastic tubing. FIG. 9 illustrates a platform 72 for supporting mold assembly 70 and the fixtures 74,75 for inserting and withdrawing the plastic tubing from the mold assembly. The mold itself, identified by number 77 in FIG. 8, is disposed within the mold assembly. To remove mold assembly 70 in order to substitute another mold assembly having a different mold, the mold assembly may be withdrawn by raising it relative to platform 72.

Figure 14:
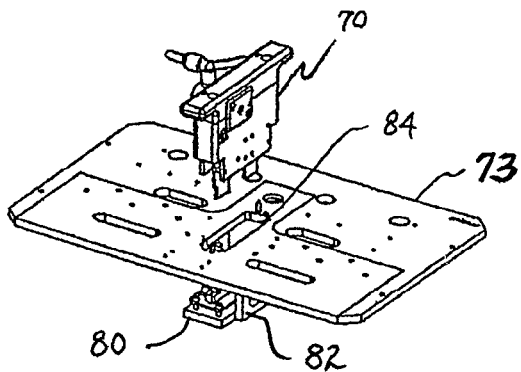
FIG. 14 is a further illustration of the location of the mold assembly and its electrical connectors relative to a substrate of the platform.
Figure 15:
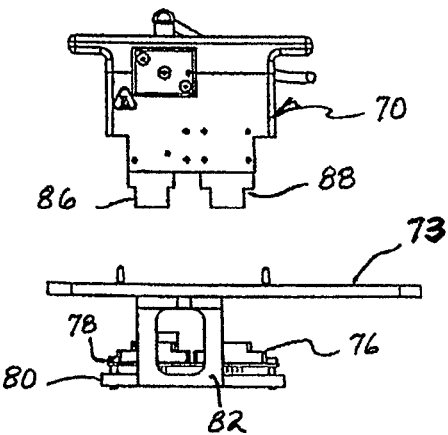
FIG. 15 is a side view of the components shown in FIG. 14.

Referring jointly to FIGS. 10-15, details attendant the mechanical and electrical interconnection between mold assembly 70 and the platform 72 will be described. A substrate 73 is disposed within the platform. The substrate mechanically supports a pair of female electrical connectors 76, 78 mounted on a plate 80. A bracket 82 extending downwardly from substrate 73, as particularly shown in FIG. 15 for supporting plate 80. Mold assembly 70 is inserted through opening 84 in substrate 73, as shown in FIG. 14. Upon such insertion, contacts attendant printed circuit board 86 engage electrical connector 78. Contacts attendant circuit board 88 electrically engage electrical connector 76. As illustrated, guide pins 90, 92 may be incorporated to ensure accurate alignment with the electrical connectors. Printed circuit board 88, identified as "Smart Mold PCBA" contains the parameters attendant operation of the mold. These parameters are transmitted via electrical connector 76 to the above discussed computer and RF generator. Additionally, printed circuit board 86 includes data attendant operation of the mold as a function of the RF generator. In particular, printed circuit board 86 includes data attendant operation of the mold as a function of the RF generator. In particular, printed circuit board 86 includes information for tuning the heater located within the mold assembly that ultimately heats the mold. Moreover, the RF energy to be applied may be transmitted through this printed circuit board.

As shown in FIG. 1A, the HMI (human machine interface), which is common in the industry, is used to display real time mold temperature, settings, graphical representation of the temperature versus time as well as identifying LEDs showing which processes are currently in operation. Other information unique to the operation under way may be displayed to an operator.

We claim:

1. A method for forming, molding, tipping and/or welding plastic tubing in a mold, said method comprising the steps of:
   a) generating an RF signal with an RF generator;
   b) forming, molding, tipping and/or welding the plastic tubing in the mold disposed in each mold assembly of a plurality of mold assemblies mounted on respective platforms;
   c) providing a control signal from a mold memory disposed in the mold assembly to the RF generator, which control signal is reflective of the parameters of the respective mold and the forming, molding, tipping and/or welding to be performed on the plastic tubing to control operation of the RF generator and provide RF energy to inductively heat the mold and the plastic tubing therein;
   d) including a computer/controller and the step of providing the control signals from each mold memory to the computer/controller for controlling operation of the RF generator; and
   serially controlling the operation of each mold assembly, its associated fixtures and the inductive heating of the respective mold through a multiplexer receiving mold dependent signals from the RF generator and the computer/controller.

2. The method as set forth in claim 1 wherein the fixtures include fixtures for inserting and withdrawing the plastic tubing from the mold and the step of regulating operation of the fixtures with signals from the computer/controller.

3. The method as set forth in claim 2 including a source of air under pressure and the step of channeling air to actuate the fixtures and to cool the mold in response to signals from the computer/controller.

4. The method as set forth in claim 1 including the step of removably mounting the mold memory in each mold assembly which mold memory provides control signals unique to the parameters of the respective mold and the nature of the tubing to be formed, molded, tipped and/or welded.

5. The method as set forth in claim 4 wherein the mold memory is a memory integrated circuit and said mounting step includes the step of detachably attaching the memory integrated circuit with the mold assembly.

6. The method as set forth in claim 1 including the step of removably mounting each mold assembly on a substrate of the respective platform.

7. The method as set forth in claim 1 including the step of interchanging different mold assemblies on a common platform.

8. A method for forming, molding, tipping and/or welding plastic material with a mold, said method comprising the steps of:
   a) generating an RF signal with an RF generator;
   b) forming, molding, tipping and/or welding the plastic material in each of a plurality of mold assemblies supporting a mold is mounted on respective platforms including fixtures for engaging and disengaging the plastic material with the respective mold;
   c) providing a control signal from each of the mold assemblies to the RF generator, which signal is reflective of the parameters of the respective mold and the plastic material associated with the respective mold to control operation of the RF generator;
   d) including a computer/controller and the step of providing the control signal to the computer for controlling operation of the RF generator; and
   e) serially controlling the operation of each mold assembly and its associated fixtures through a multiplexer receiving mold dependent signals from the RF generator and the computer/controller.

9. The method as set forth in claim 8 wherein the plastic material is plastic tubing, and including fixtures for inserting and withdrawing the plastic tubing from the mold and the step of regulating operation of the fixtures with signals from the computer/controller.

10. The method as set forth in claim 9 including a source of air under pressure and the step of channeling air to actuate the fixtures and to cool the mold in response to signals from the computer/controller.

11. The method as set forth in claim 8 including the step of mounting a control circuit with each mold assembly to provide control signals unique to the parameters of the respective mold.

12. The method as set forth in claim 11 wherein said mounting step includes the step of detachably attaching a memory integrated circuit.

13. The method as set forth in claim 8 including the step of removably mounting the mold assembly on a respective substrate of the platform.

14. The method as set forth in claim 13 including the step of interchanging different mold assemblies on the platform.

* * * * *